(12) United States Patent
Pierce et al.

(10) Patent No.: US 11,569,490 B2
(45) Date of Patent: *Jan. 31, 2023

(54) CONTINUOUS PRODUCTION OF BINDER AND COLLECTOR-LESS SELF-STANDING ELECTRODES FOR LI-ION BATTERIES BY USING CARBON NANOTUBES AS AN ADDITIVE

(71) Applicants: HONDA MOTOR CO., LTD., Tokyo (JP); NANOSYNTHESIS PLUS, LTD., Columbus, OH (US)

(72) Inventors: Neal Pierce, Beavercreek, OH (US); Avetik Harutyunyan, Columbus, OH (US); Elena Mora Pigos, Galena, OH (US)

(73) Assignees: HONDA MOTOR CO., LTD., Tokyo (JP); NANOSYNTHESIS PLUS, LTD., Columbus, OH (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/334,647

(22) Filed: May 28, 2021

(65) Prior Publication Data

US 2021/0296629 A1   Sep. 23, 2021
US 2022/0140306 A9   May 5, 2022

Related U.S. Application Data

(63) Continuation of application No. 15/665,142, filed on Jul. 31, 2017.

(51) Int. Cl.
*H01M 4/04* (2006.01)
*H01M 4/505* (2010.01)
(Continued)

(52) U.S. Cl.
CPC .......... *H01M 4/0419* (2013.01); *C01B 32/16* (2017.08); *C01B 32/162* (2017.08); *C01G 53/50* (2013.01);
(Continued)

(58) Field of Classification Search
None
See application file for complete search history.

(56) References Cited

U.S. PATENT DOCUMENTS 3,513,034 A   5/1970   Fischbach et al.
3,772,084 A   11/1973  Scholle
(Continued)

FOREIGN PATENT DOCUMENTS

CN   1922347 A   2/2007
CN   1972739 A   5/2007
(Continued)

OTHER PUBLICATIONS

Notice of Reasons for Rejection issued by the Japanese Patent Office related to Japanese Patent Application No. 2020-002545, dated Aug. 17, 2021.
(Continued)

*Primary Examiner* — Gregg Cantelmo
(74) *Attorney, Agent, or Firm* — ArentFox Schiff LLP; Mark Duell

(57) ABSTRACT

The present disclosure is directed to a method and apparatus for continuous production of composites of carbon nanotubes and electrode active material from decoupled sources. Composites thusly produced may be used as self-standing electrodes without binder or collector. Moreover, the method of the present disclosure may allow more cost-efficient production while simultaneously affording control over nanotube loading and composite thickness.

20 Claims, 8 Drawing Sheets

(51) Int. Cl.

| | |
|---|---|
| *H01M 4/525* | (2010.01) |
| *H01M 4/62* | (2006.01) |
| *H01M 4/485* | (2010.01) |
| *H01M 4/583* | (2010.01) |
| *H01M 4/133* | (2010.01) |
| *H01M 4/52* | (2010.01) |
| *H01M 4/139* | (2010.01) |
| *C01B 32/16* | (2017.01) |
| *C01G 53/00* | (2006.01) |
| *C01B 32/162* | (2017.01) |
| *B82Y 30/00* | (2011.01) |
| *B82Y 40/00* | (2011.01) |

(52) U.S. Cl.
CPC ......... *H01M 4/0428* (2013.01); *H01M 4/133* (2013.01); *H01M 4/139* (2013.01); *H01M 4/485* (2013.01); *H01M 4/505* (2013.01); *H01M 4/52* (2013.01); *H01M 4/525* (2013.01); *H01M 4/583* (2013.01); *H01M 4/625* (2013.01); *B82Y 30/00* (2013.01); *B82Y 40/00* (2013.01); *C01B 2202/02* (2013.01); *C01P 2006/40* (2013.01); *Y10S 977/75* (2013.01); *Y10S 977/842* (2013.01); *Y10S 977/948* (2013.01)

(56) References Cited

U.S. PATENT DOCUMENTS

| | | | |
|---|---|---|---|
| 4,119,771 | A | 10/1978 | Saridakis |
| 5,985,175 | A | 11/1999 | Fan et al. |
| 7,094,385 | B2 | 8/2006 | Beguin et al. |
| 7,288,870 | B2 | 10/2007 | Mitcham et al. |
| 7,348,101 | B2 | 3/2008 | Gozdz et al. |
| 7,622,059 | B2 | 11/2009 | Bordere et al. |
| 7,999,028 | B2 | 8/2011 | Lin et al. |
| 8,083,905 | B2 | 12/2011 | Choi et al. |
| 8,084,158 | B2 | 12/2011 | Chu et al. |
| 8,293,204 | B2 | 10/2012 | Khodadadi et al. |
| 8,435,676 | B2 | 5/2013 | Zhamu et al. |
| 8,465,871 | B2 | 6/2013 | Juzkow et al. |
| 8,628,747 | B2 | 1/2014 | Zachariah et al. |
| 8,703,092 | B2 | 4/2014 | Ziegler |
| 8,787,001 | B2 | 7/2014 | Fleischer et al. |
| 8,825,178 | B2 | 9/2014 | Feng et al. |
| 8,883,113 | B2 | 11/2014 | Richter et al. |
| 8,974,960 | B2 | 3/2015 | Manthiram et al. |
| 8,986,872 | B2 | 3/2015 | Lev et al. |
| 9,034,421 | B2 | 5/2015 | Mikhaylik et al. |
| 9,167,736 | B2 | 10/2015 | Shah et al. |
| 9,396,829 | B2 | 7/2016 | Mann et al. |
| 9,406,985 | B2 | 8/2016 | Amaratunga et al. |
| 9,450,266 | B2 | 9/2016 | Hosaka et al. |
| 9,502,734 | B1 | 11/2016 | Lim et al. |
| 9,615,473 | B2 | 4/2017 | Kim |
| 9,692,056 | B1 | 6/2017 | Liu et al. |
| 9,711,763 | B2 | 7/2017 | Sohn et al. |
| 9,782,082 | B2 | 10/2017 | Gannon et al. |
| 9,786,872 | B2 | 10/2017 | Suh et al. |
| 9,807,876 | B2 | 10/2017 | Catchpole |
| 9,812,681 | B2 | 11/2017 | Heo |
| 9,859,586 | B2 | 1/2018 | Suh et al. |
| 9,887,644 | B2 | 2/2018 | Kim et al. |
| 9,941,492 | B2 | 4/2018 | Suh et al. |
| 9,972,868 | B2 | 5/2018 | Choi et al. |
| 9,979,225 | B2 | 5/2018 | Bernhard |
| 10,033,031 | B2 | 7/2018 | Wang et al. |
| 10,090,556 | B2 | 10/2018 | Rho et al. |
| 10,096,803 | B2 | 10/2018 | Iseri et al. |
| 10,122,010 | B2 | 11/2018 | Tajima et al. |
| 10,147,915 | B2 | 12/2018 | Song et al. |
| 10,199,851 | B2 | 2/2019 | Hiroki et al. |
| 10,217,971 | B2 | 2/2019 | Takahashi et al. |
| 10,658,651 | B2 * | 5/2020 | Pierce ............... B01J 19/00 |
| 10,957,939 | B2 | 3/2021 | Zhi et al. |
| 2003/0084847 | A1 | 5/2003 | Wood |
| 2003/0099883 | A1 | 5/2003 | Ochoa et al. |
| 2004/0086783 | A1 | 5/2004 | Fong et al. |
| 2004/0234445 | A1 | 11/2004 | Serp et al. |
| 2005/0008778 | A1 | 1/2005 | Utsugi |
| 2005/0063891 | A1 | 3/2005 | Shaffer et al. |
| 2005/0148887 | A1 | 7/2005 | Reiter et al. |
| 2005/0209392 | A1 | 9/2005 | Luo et al. |
| 2005/0221185 | A1 | 10/2005 | Sakata et al. |
| 2006/0039849 | A1 | 2/2006 | Resasco et al. |
| 2006/0078489 | A1 | 4/2006 | Harutyunyan et al. |
| 2006/0116443 | A1 | 6/2006 | Probst et al. |
| 2006/0151318 | A1 | 7/2006 | Park et al. |
| 2006/0245996 | A1 | 11/2006 | Xie et al. |
| 2007/0224106 | A1 | 9/2007 | Sakakibara et al. |
| 2007/0274899 | A1 | 11/2007 | Wolf et al. |
| 2008/0131351 | A1 | 6/2008 | Wang et al. |
| 2008/0210550 | A1 | 9/2008 | Walther |
| 2008/0233402 | A1 | 9/2008 | Carlson et al. |
| 2008/0258117 | A1 | 10/2008 | Sakakibara et al. |
| 2009/0117026 | A1 | 5/2009 | Shimazu et al. |
| 2009/0142659 | A1 | 6/2009 | Lai et al. |
| 2009/0208708 | A1 | 8/2009 | Wei et al. |
| 2009/0226704 | A1 | 9/2009 | Kauppinen et al. |
| 2009/0274609 | A1 | 11/2009 | Harutyunyan et al. |
| 2009/0286675 | A1 | 11/2009 | Wei et al. |
| 2010/0000441 | A1 | 1/2010 | Jang et al. |
| 2010/0038602 | A1 | 2/2010 | Plee |
| 2010/0112443 | A1 | 5/2010 | Blomgren et al. |
| 2010/0140560 | A1 | 6/2010 | Wang et al. |
| 2010/0178543 | A1 | 7/2010 | Gruner et al. |
| 2010/0221606 | A1 | 9/2010 | Nalamasu |
| 2010/0276644 | A1 | 11/2010 | Wolf et al. |
| 2010/0285352 | A1 | 11/2010 | Juzkow et al. |
| 2010/0285358 | A1 | 11/2010 | Cui |
| 2011/0060162 | A1 | 3/2011 | Tatsuhara et al. |
| 2011/0096465 | A1 | 4/2011 | Zhou et al. |
| 2011/0111279 | A1 | 5/2011 | Smithyman et al. |
| 2011/0123429 | A1 | 5/2011 | Bordere et al. |
| 2011/0150746 | A1 | 6/2011 | Khodadadi et al. |
| 2011/0158892 | A1 | 6/2011 | Yamaki |
| 2011/0171398 | A1 | 7/2011 | Oladeji |
| 2011/0177393 | A1 | 7/2011 | Park et al. |
| 2011/0281156 | A1 | 11/2011 | Boren et al. |
| 2011/0311874 | A1 | 12/2011 | Zhou et al. |
| 2012/0105370 | A1 | 5/2012 | Moore |
| 2012/0107683 | A1 | 5/2012 | Kim et al. |
| 2012/0121986 | A1 | 5/2012 | Balu et al. |
| 2012/0132861 | A1 | 5/2012 | Tamamitsu et al. |
| 2012/0138148 | A1 | 6/2012 | Harutyunyan |
| 2012/0141864 | A1 | 6/2012 | Juzkow et al. |
| 2012/0149824 | A1 | 6/2012 | Hocke et al. |
| 2012/0156034 | A1 | 6/2012 | Sabannavar et al. |
| 2012/0177934 | A1 | 7/2012 | Vogel et al. |
| 2012/0193602 | A1 | 8/2012 | Lieber et al. |
| 2012/0219490 | A1 | 8/2012 | Noda et al. |
| 2012/0241666 | A1 | 9/2012 | Hong et al. |
| 2012/0282522 | A1 | 11/2012 | Axelbaum et al. |
| 2012/0032191 | A1 | 12/2012 | Watanabe et al. |
| 2012/0315539 | A1 | 12/2012 | Lashmore et al. |
| 2013/0040229 | A1 | 2/2013 | Grigorian et al. |
| 2013/0065125 | A1 | 3/2013 | Sawaki et al. |
| 2013/0065130 | A1 | 3/2013 | Ban et al. |
| 2013/0106026 | A1 | 5/2013 | Wang et al. |
| 2013/0143077 | A1 | 6/2013 | Yebka et al. |
| 2013/0149440 | A1 | 6/2013 | Pyzik et al. |
| 2013/0171485 | A1 | 7/2013 | Kodera et al. |
| 2013/0171496 | A1 | 7/2013 | Wang et al. |
| 2013/0189565 | A1 | 7/2013 | Lashmore et al. |
| 2013/0224551 | A1 | 8/2013 | Hiralal et al. |
| 2013/0256011 | A1 | 10/2013 | Chang et al. |
| 2013/0323583 | A1 | 12/2013 | Phares |
| 2014/0005960 | A1 | 1/2014 | Anderson et al. |
| 2014/0013588 | A1 | 1/2014 | Wang et al. |
| 2014/0021403 | A1 | 1/2014 | Kim et al. |
| 2014/0057178 | A1 | 2/2014 | He et al. |
| 2014/0065447 | A1 | 3/2014 | Liu et al. |
| 2014/0093769 | A1 | 4/2014 | Busnaina et al. |

(56) References Cited

U.S. PATENT DOCUMENTS

| | | |
|---|---|---|
| 2014/0141248 A1 | 5/2014 | Noyes |
| 2014/0170490 A1 | 6/2014 | Izuhara et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0393486 A1 | 12/2019 | He et al. |
| 2020/0006772 A1 | 1/2020 | Yu et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 101801394 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 103204492 A | 7/2013 |
| CN | 204072059 U | 1/2015 |
| CN | 104752651 A | 7/2015 |
| CN | 103219467 B | 11/2015 |
| CN | 103715394 B | 1/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 104362326 B | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2476648 A1 | 7/2012 |
| EP | 2835177 A1 | 2/2015 |
| JP | 6-267515 A | 9/1994 |
| JP | 11-0315002 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-054113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |
| WO | WO 2011/030821 A1 | 3/2011 |
| WO | WO 2012/156297 A1 | 11/2012 |
| WO | WO 2013/052704 A1 | 4/2013 |
| WO | WO 2014/102131 A1 | 7/2014 |
| WO | WO 2014/153465 A1 | 9/2014 |
| WO | WO 2015/100762 A1 | 7/2015 |

(56) References Cited

FOREIGN PATENT DOCUMENTS

| WO | WO 2016/031335 A1 | 3/2016 |
|----|-------------------|--------|
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |
| WO | WO 2018/194415 A | 10/2018 |
| WO | WO 2019/027147 A1 | 2/2019 |

OTHER PUBLICATIONS

Communication dated Feb. 23, 2022, from the State Intellectual Property Office of People's Republic of China in Application No. 202010079226.0.

A. Weidenkaff et al. "Metal Nanoparticles for the Production of Carbon Nanotube Composite Materials by Decomposition of Different Carbon Sources" Materials Science and Engineering C 19, pp. 119-123, 2002.

A.J. Clancy et al., "A One-Step Route to Solubilised, Purified or Functionalised Single-Walled Carbon Nanotunes", Journal of Materials Chemistry A, pp. 16708-16715, 2015.

Beate Krause et al., "Disperability and Particle Size Distribution of CNTs in an Aqeous Surfactant Dispersion as a Function of Ultrasonic Treatment Time" Carbon 48, pp. 2746-2754, 2010.

Chee Howe See et al., "CaCO3 Suppoerted Co—Fe Catalysts for Carbon Nanotube Synthesis in Fluidized Bed Reactors" Particle Technology and Fluidization, vol. 54, No. 3, pp. 657-664, Mar. 2008.

Communication dated Aug. 26, 2019, from the European Patent Office in related European Application No. 18186402.6.

Communication dated Dec. 15, 2020, from Japanese Patent Office in counterpart application No. 2020-002026.

Communication dated Jan. 6, 2021. from the Japanese Patent Office in related application No. 2020-002545.

Communication dated Jul. 31, 2019, from the European Patent Office in counterpart European Application No. 18194454.7.

Communication issued by the International Searching Authority in corresponding International Application No. PCT/US19/49923 dated Nov. 13, 2019 (PCT/ISA/206).

Danafar et. al., "Fluidized bed catalytic chemical vapor deposition synthesis of carbon nanotubes—A review," the Chemical Engineering Journal, vol. 155, pp. 37-48, 2009.

Dunens, O., et. al., "Synthesis of Multiwalled Carbon Nanotubes on Fly Ash Derived Catalysts," Environ. Sci. Technol., vol. 43, pp. 7889-7894, 2009.

Extended European Search Report issued in corresponding European Patent Application No. 18186402.6 dated Aug. 26, 2019.

Extended European Search Report issued in corresponding European Patent Application No. 18186402.6 dated Oct. 11, 2018.

Extended European Search Report issued in corresponding European Patent Application No. 18194469.5 dated Dec. 4, 2018.

Extended European Search Report issued in related European Patent Application No. 18173644.8 dated Oct. 12, 2018.

Extended European Search Report of related European Patent Application No. 18184002.6, dated Nov. 30, 2018.

Extended Search Report of related EP Application No. 18 19 4454 dated Jul. 23, 2019.

Hasegawa Kei et al., "Lithium Ion Batteries Made of Electrodes with 99 wt% active materials and 1wt% carbon nanotubes without binder or metal foils", Journal of Power Sources, vol. 321, pp. 155-162, 2016.

Howard Wang, "Dispersing Carbon Nanotubes Usuing Surfactants" Current Opinion in Colloid & Interface Science 14, pp. 364-371, 2009.

Hu, Liangbing et al., Thin, Flexible Secondary Li-Ion Paper Batteries, ACS Nano, vol. 4, No. 10, pp. 5843-5848, 2010.

International Search Report and the Written Opinion issued by the International Searching Authority corresponding to PCT/US20/43017, dated Dec. 14, 2020.

International Search Report and Written Opinion, issued by International Searching Authority in related International Application No. PCT/US19/49923, dated Jan. 23, 2020.

International Search Report and Written Opinion, issued by International Searching Authority in related International Application No. PCT/US2020/039821, dated Sep. 30, 2020.

International Search Report issued by the International Search Authority in corresponding International Patent Application No. PCT/US2020/020993, dated Jul. 2, 2020.

Jenax Inc., Flexible Lithium Polymer Battery J . Flex, Copyright 2014, (6 Pages Total).

Joo-Seong Kim et al., Supporting Information, A Half Millimeter Thick Coplanar Flexible Battery with Wireless Recharging Capability, Nano Letters 2015 15 (4), 9 Pages Total, (2015).

Kim et al., "A Half Millimeter Thick Coplanar Flexible Battery with Wireless Recharging Capability", Nano Letters, American Chemical Society, 2015, (8 Pages Total).

Kun Kelvin Fu et al., "Flexible Batteries: From Mechanics to Devices", 2016 American Chemical Society, ACS Publications, ACS Energy Letters 1, pp. 1065-1079, (2016).

Linqin Jiang et al., "Production of Aqueous Colloidal Dispersions of Carbon Nanotubes", Journal of Colloid and Interface Science, pp. 89-94, 2003.

Liu et al., "Carbon nanotube (CNT)-based composites as electrode material for rechargeable Li-ion batteries: A review"; Composite Science and Technology, vol. 72., Issue 2 (Jan. 18, 2012); pp. 121-144. (Year: 2012).

Luo Shu et al., "Binder-Free LiCoO2/Carbon Nanotube Cathodes for High-Performance Lithium Ion Batteries" Advanced Materials, vol. 24, pp. 2294-2298, 2012.

Nanalyze., A Flexible Battery from Blue Spark Technologies, Apr. 8, 2014, (4 Pages Total).

Notice of Reasons for Rejection issued by the Japanes Patent Office corresponding to Japanese Application No. 2017-048275, dated Dec. 1, 2020.

Notice of Reasons for Rejection issued by the Japanese Patent Office corresponding to Japanese Patent Application No. 2017-048276, dated Dec. 1, 2021.

O.M. Marago, et al, "Optical trapping of carbon nanotubes", Physica E, 40 (2008), pp. 2347-2351.

Panasonic Corp., Panasonic Develops Bendable, Twistable, Flexible Lithium-ion Battery, Sep. 29, 2016, (8 Pages Total).

ProLogium Technology Co., Ltd., FLCB Flexible Type LCB, Copyright 2015, (6 Pages Total).

Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).

Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2269-2274, 2010.

Sau Yen Chew et al.., "Flexible free-standing carbon nanotube films for model lithium-ion batteries", Carbon 47, pp. 2976-2983, (2009).

Schiller, David. "Development of a Stretchable Battery Pack for Wearable Applications." submitted by David Schiller, BSc. Diss. Universit't Linz, Nov. 2019, p. 19-37 [online] <https://epub.jku.at/obvulihs/content/titleinfo/4605900/full.pdf>.

Sebastian Anthony., LG produces the first flexible cable-type lithium-ion battery, ExtremeTech, Aug. 30, 2012, (9 Pages Total).

Sheng Xu et al., "Stretchable batteries with self-similar serpentine interconnects and integrated wireless recharging systmes" Nature communications 4:1543, DOI: 10.1038/ncomms2553, 8 Pages Total, (2013).

The Swatch Group Ltd., A revolutionary battery by Belenos: The Watchmaker Swatch Group Has Signed an Agreement With the Chinese Geely Group for Use of Its Innovative New Battery., as accecced on May 29, 2019, (3 Pages Total).

Vishwam Sankaran., Samsung is reportedly developing a curved battery for its foldable phone, Jul. 4, 2018, (4 Pages Total).

(56) References Cited

OTHER PUBLICATIONS

Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Xu, Shen, et al., "Stretchable batteries with self-similar serpentine interconnects and intergrated wireless recharging systems." Nature Communications 4.1, Fig 1a-1e, p. 1-8, (2013).
Zhao, M.Q. et. al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Office Action dated Jun. 28, 2022, issued by the Korean Patent Office in related Korean Application No. 10-2022-0057879.
Communication dated Mar. 22, 2022, issued by the Chinese Patent Office in related Chinese Application No. 201811076414.7.
Jung, Sungmook, et al., "Wearable Fall Detector using Integrated Sensors and Energy Devices", Scientific Reports, pp. 1-9, Nov. 24, 2015.
Office Action issued by the Korean Patent Office in related Korean Patent Application No. 10-2020-0005929, dated Jul. 27, 2021.
Ostfeld, Aminy E., et al., "High-performance flexible energy storage and harvesting system for wearable electronics", Scientific Reports, pp. 1-10, May 17, 2016.
Li, Zhen, et al., "Large area, highly transparent carbon nanotube spiderwebs for energy harvesting", Journal of Materials Chemistry, pp. 7236-7240, 2010.
Su, Fenghua, et al., "High-Performance Two-Ply Yarn Supercapacitors Based on Carbon Nanotube Yarns Dotted with Co3O4 and NiO Nanoparticles", Small 2015, pp. 854-861 with Supporting Information, 2015.
Zhang, Sen, et al., "Porous, Platinum Nanoparticle-Adsor bed Carbon Nanontube Yarns for Efficient Fiber Solar Cells", ACS Nano, pp. 7191-7198 with Supporting Information, 2012.
Communication dated May 6, 2022, from Chinese Patent Office in related Chinese Application No. 201710150360.3, with English Translation.
Jiang, Shan et al., "Series in Science Communication by Chinese Academy of Sciences: Nanometer," Popular Science Press, pp. 155-157, Sep. 2013.
Liu, Yurong, "Applications of Carbon Materials in Supercapacitor," National Defense Industry Press, p. 142, Jan. 2013.
Office Action issued by Chinese Patent Office in related Chinese Patent Application No. 201710151455.7, dated Jul. 16, 2021.
Communication dated Jan. 27, 2022, issued by the Chinese Patent Office in related Chinese Application No. 201710150360.3.
Communication dated Sep. 26, 2021, issued by the Korean Intellectual Property Office in related Korean Application No. 10-2018-0058433.
Communication dated Mar. 14, 2022, issued by the Japanese Patent Office in related Japanese Application No. 2018-142355.
Shi, Yang, et al., "Graphene-based integrated electrodes for flexible lithium ion batteries", 2D Materials 2.2 (2015) 0204004 (2015).
Communication dated Oct. 19, 2022, from the State Intellectual Property Office of the People's Republic of China in Application No. 201811076414.7.
First Office Action dated Aug. 25, 2022, from the State Intellectual Property Office of People's Republic of China in Application No. 201810503719.5.
Ling-ling Gu et al., "Preparation and Applications of Carbon Nanotube/Polymer Composites", Polymer Materials Science and Engineering, vol. 25, No. 11, (Nov. 2009). (5 Page Total, abstract on p. 5).
Cha, Seung I., et al., "Mechanical and electrical properties of cross-linked carbon nanotubes." Carbon 46.3 (2008): pp. 482-488 (Year: 2008).

* cited by examiner

S100 — Separately Providing Aerosolized Nanotubes and Aerosolized Electrode Active Material

S101 — Directing the Aerosolized Nanotubes and the Aerosolized Electrode Active Material to a Porous Substrate to Form a Self-Standing Electrode

S102 — Optionally Pressing the Self-Standing Electrode

FIG. 1

CONTINUOUS PRODUCTION OF BINDER AND COLLECTOR-LESS SELF-STANDING ELECTRODES FOR LI-ION BATTERIES BY USING CARBON NANOTUBES AS AN ADDITIVE

CROSS-REFERENCE TO RELATED APPLICATIONS

This application is a continuation of U.S. patent application Ser. No. 15/665,142, entitled "CONTINUOUS PRODUCTION OF BINDER AND COLLECTOR-LESS SELF-STANDING ELECTRODES FOR LI-ION BATTERIES BY USING CARBON NANOTUBES AS AN ADDITIVE," filed on Jul. 31, 2017, the contents of which are expressly incorporated by reference herein in their entirety.

JOINT RESEARCH AGREEMENT

The presently claimed invention was made by or on behalf of the below listed parties to a joint research agreement. The joint research agreement was in effect on or before the date the claimed invention was made, and the claimed invention was made as a result of activities undertaken within the scope of the joint research agreement. The parties to the joint research agreement are 1) Honda Research Institute USA, Inc.; and 2) NanoSynthesis Plus, Ltd.

BACKGROUND

Single-walled carbon nanotubes (SWNTs) as additives in various matrices has become one of the most intensively studied areas for applications, owing to their excellent electrical and mechanical properties and high aspect ratio, which is crucial for composite materials. Among various applications, the exploitation of SWNTs as an additive material for performance enhancement of battery electrodes is very promising. The core of mixing technologies is based on liquid process and includes five required steps: a) synthesis of nanotubes, b) dispersion of nanotubes in the proper solvent (de-aggregation), c) functionalization of the nanotube surfaces (protecting against aggregation), d) mixing with binder, and e) mixing with active material (preparing slurry). These preferences are not only expensive, but they also degrade nanotube properties; for example, dispersion by ball milling, sonication, etc. leads to the inevitable reduction of aspect ratio and the introduction of defects, and as a result, more nanotube loading (weight %) is required for improved performance. cl SUM MARY In some embodiments, the present disclosure is directed to a method of making a self-standing electrode, the method comprising fluidizing an electrode active material; and co-depositing the fluidized electrode active material and single-walled carbon nanotubes onto a movable porous flexible substrate to form a self-standing electrode that is a composite of the electrode active material and the single-walled carbon nanotubes.

In some embodiments, the present disclosure is directed to an apparatus for producing a self-standing electrode, the apparatus comprising a carbon nanotube synthesis reactor configured to synthesize carbon nanotubes; an active material container configured to fluidize an electrode active material; a movable porous flexible substrate configured to collect the carbon nanotubes and the fluidized electrode active material and form the self-standing electrode comprising a composite of the carbon nanotubes and the electrode active material.

BRIEF DESCRIPTION OF THE DRAWINGS

FIG. 1 is a schematic block diagram illustrating an exemplary method of making a self-standing electrode according to an embodiment of the present disclosure.

DETAILED DESCRIPTION

The present disclosure provides method and apparatus for the production of self-standing electrodes. Also provided are self-standing electrodes comprising a mixture of nanotube and electrode active materials.

In an embodiment, a self-standing electrode is prepared by separately providing aerosolized nanotubes and aerosolized electrode active material, and directing the aerosolized nanotubes and the aerosolized electrode active materials to a movable porous substrate to form a self-standing electrode thereon comprising the mixed carbon nanotubes and the electrode active material.

Figure 4:
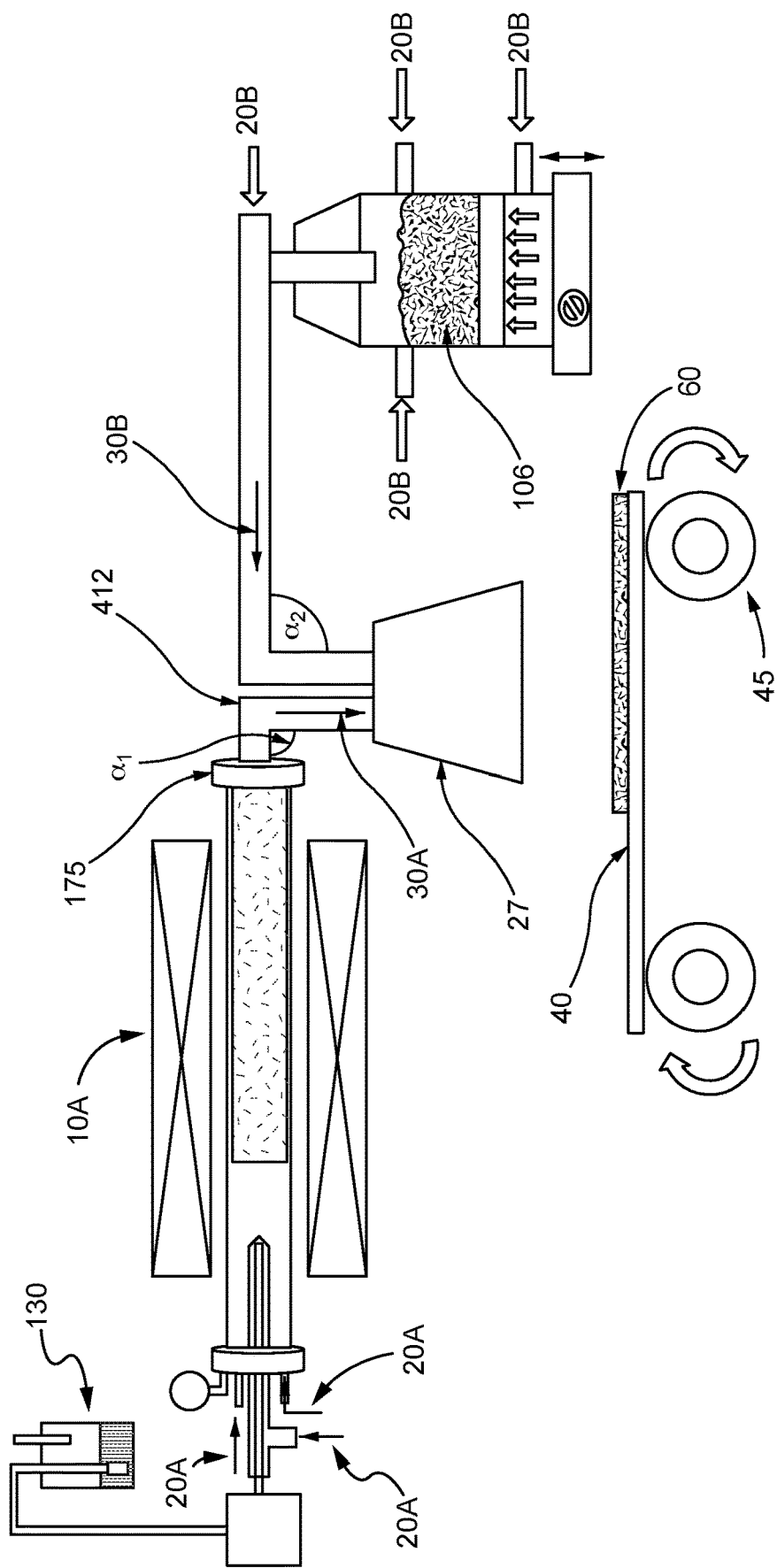
FIG. 4 shows an example of a schematic of an apparatus according to an embodiment of the present disclosure.
Figure 5:
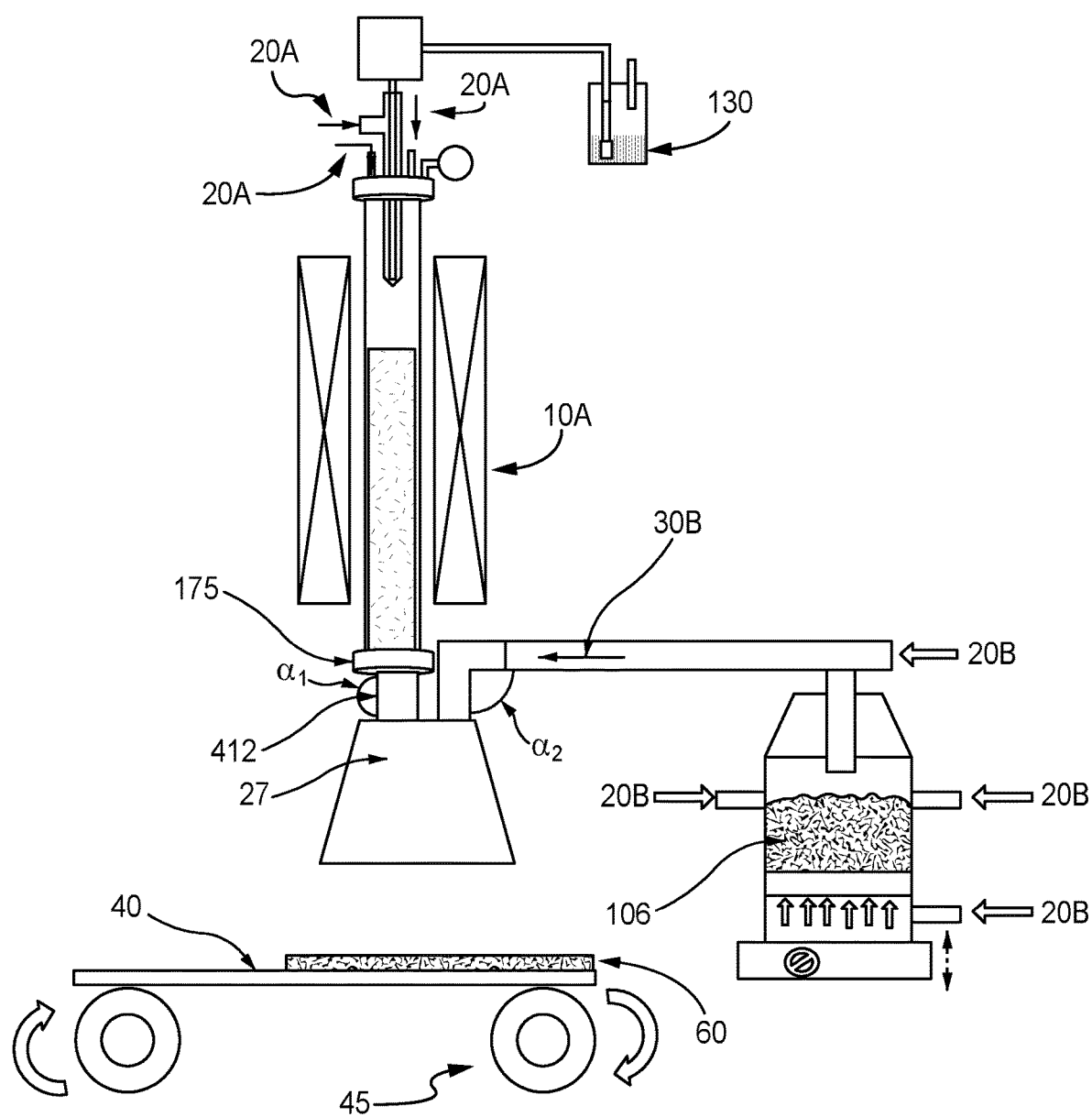
FIG. 5 shows an example of an alternate schematic of an apparatus according to an embodiment of the present disclosure.

The present disclosure is directed to a method and apparatus for continuous production of self-standing electrodes for Li-ion batteries by using a single step co-deposition of carbon nanotubes and electrode active material on a moving porous substrate. Carbon nanotubes from the synthesis reactor and the fluidized active material powder may be directly deposited from a container onto a porous flexible substrate that is attached to a roll-to-roll system (FIGS. 4 and 5).

The resulting deposited layer contains well dispersed nanotubes in an active electrode material. Independent control of the nanotube and active material deposition rate allows adjustment of the ratio of nanotube to active material (weight %). The thickness of the composite obtained can be controlled, for example by varying the substrate motion speed for a given deposition rate. The composite can be removed from the porous substrate, and the layer is self-supporting, flexible, and can be cut to any desirable size. The composite can be used as an electrode without any additional binder or collector (alumina or copper, depending on the electrode type). The exploitation of this electrode opens the opportunity to increase the energy and power densities of batteries. In addition, using decoupled sources for nanotube and active material powder deposition, as well as implementing a roll-to-roll system, may allow for control over nanotube loading (weight %) and composite thickness.

Moreover, the method of the present disclosure can be run continuously, and may provide cost efficiency.

In some embodiments, the present disclosure is directed to a method of making a self-standing electrode, the method comprising fluidizing an electrode active material; and co-depositing the fluidized electrode active material and single-walled carbon nanotubes onto a movable porous flexible substrate to form a self-standing electrode that is a composite of the electrode active material and the single-walled carbon nanotubes.

As used herein, "electrode active material" refers to the conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

In a non-limiting example as shown in FIG. 1, self-standing electrodes for Li-ion batteries are prepared by separately providing aerosolized carbon nanotubes and aerosolized electrode active materials at step S100, and directing the aerosolized carbon nanotubes and the aerosolized electrode active materials to a porous substrate at step S101 to form a composite self-standing electrode of a desired thickness thereon that comprises the mixed carbon nanotubes and the electrode active materials. Optionally, the self-standing electrode can be treated at step S102 to, for example, increase the density of the self-standing electrode. The self-standing electrode is self-supported, flexible, and can optionally be cut to the desired dimensions of a battery electrode. The self-standing electrode is optionally free of binder and optionally can be used without a metal-based current collector (typically alumina or copper depending on the electrode type).

Figure 2:
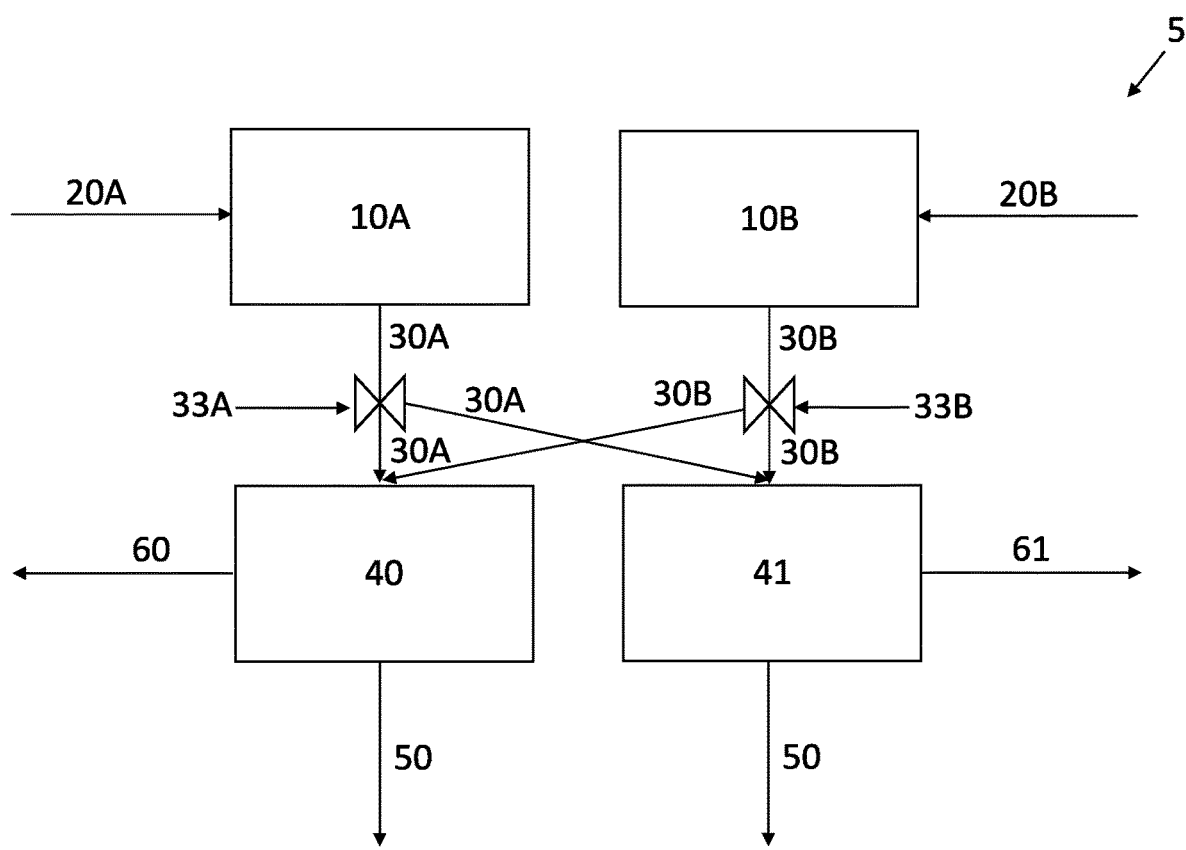
FIG. 2 is a flow diagram illustrating an exemplary apparatus for making a self-standing electrode according to an embodiment of the present disclosure.

The apparatus of providing the aerosolized carbon nanotubes and the aerosolized electrode active materials is not limited in any way. In an illustrative example as shown in FIG. 2, an apparatus 5 for the production of self-standing electrodes is provided. The carbon nanotubes and the electrode active materials are added to separate vessels 10A, 10B. The carbon nanotubes and the electrode active materials may be individually collected from their respective manufacturing processes and directly or indirectly introduced from such processes into the vessels 10A, 10B at a desired ratio for the self-standing electrode. One or more carrier gases 20A, 20B may then be introduced to the vessels 10A, 10B to aerosolize the nanotubes and the electrode active materials. The resulting aerosolized streams 30A, 30B comprising the nanotubes and the electrode active materials (separately) entrained in the carrier gas are directed to a movable porous substrate 40, such as a filter. The carrier gas passes through the movable porous substrate 40 as gas stream 50 while the mixture of the nanotubes and the electrode active material is captured on the surface of the movable porous substrate 40 to form the self-standing electrode 60. The self-standing electrode 60 can be removed from the movable porous substrate 40 when it reaches the desired thickness.

Optionally, the apparatus 5 may include a plurality of movable porous substrates 40, 41 to allow for the continuous production of self-standing electrodes 60, 61. Although only two porous substrates are shown, it is to be understood that any number of porous substrates may be included in the apparatus 5. In a non-limiting example, when the flow of the aerosolized streams 30A, 30B across the movable porous substrate 40 produces the self-standing electrode 60 of the desired thickness, valves 33A, 33B may be adjusted to transfer the flow of the aerosolized streams 30A, 30B to a second movable porous substrate 41. The self-standing electrode 60 may be removed from the first movable porous substrate 40 during formation of the self-standing electrode 61 on the movable porous substrate 41. When the flow of the aerosolized streams 30A, 30B across the second movable porous substrate 41 produces the self-standing electrode 61 of a desired thickness, the valves 33A, 33B may be adjusted to transfer the flow of the aerosolized streams 30A, 30B back to the first movable porous substrate 40. The thickness and/or cross-sectional area of the self-standing electrode 61 may be the same, or different, than the cross-sectional area of the self-standing electrode 60. For example, the self-standing electrode 61 may have a greater thickness and/or cross-sectional area than the self-standing electrode 60.

It is to be understood that a variety of different methods may be used for automatically switching the valves 33A, 33B to redirect the flow of the aerosolized streams 30A, 30B from one movable porous substrate to the other. Illustrative examples of systems that may be used to adjust the valves 33A, 33B to redirect the flow of the aerosolized streams 30A, 30B include one or more sensors for detecting the thickness of the self-standing electrodes 60 and 61, one or more pressure sensors for monitoring a pressure drop across the movable porous substrates 40 and 41 that corresponds to a desired thickness of the self-standing electrodes 60 and 61, a timer that switches the valves 33A, 33B after a set time corresponding to a desired thickness of the self-standing electrodes 60 and 61 for a given flow rate of the aerosolized streams 30A, 30B, and any combination thereof; after the one or more pressure sensors measures a pressure drop associated with the desired thickness of the self-standing electrode 60 or 61 on porous substrate 40 or 41, or after the one or more thickness sensors detect the desired thickness of the self-standing electrode 60 or 61 on porous substrate 40 or 41, or after the timer measures the set time corresponding to the desired thickness of self-standing electrode 60 or 61 on porous substrate 40 or 41, the mixture is redirected from one porous substrate to the other. It is also to be understood that the movable porous substrates 40 and/or 41 may have a cross-sectional area that matches the desired cross-sectional area required for use in the battery cell to be made with the self-standing electrode 60 and/or 61. Accordingly, the self-standing electrodes 60 and/or 61 would require no further processing of the cross-sectional area, such as cutting, before assembly in the final battery cell.

Figure 3:
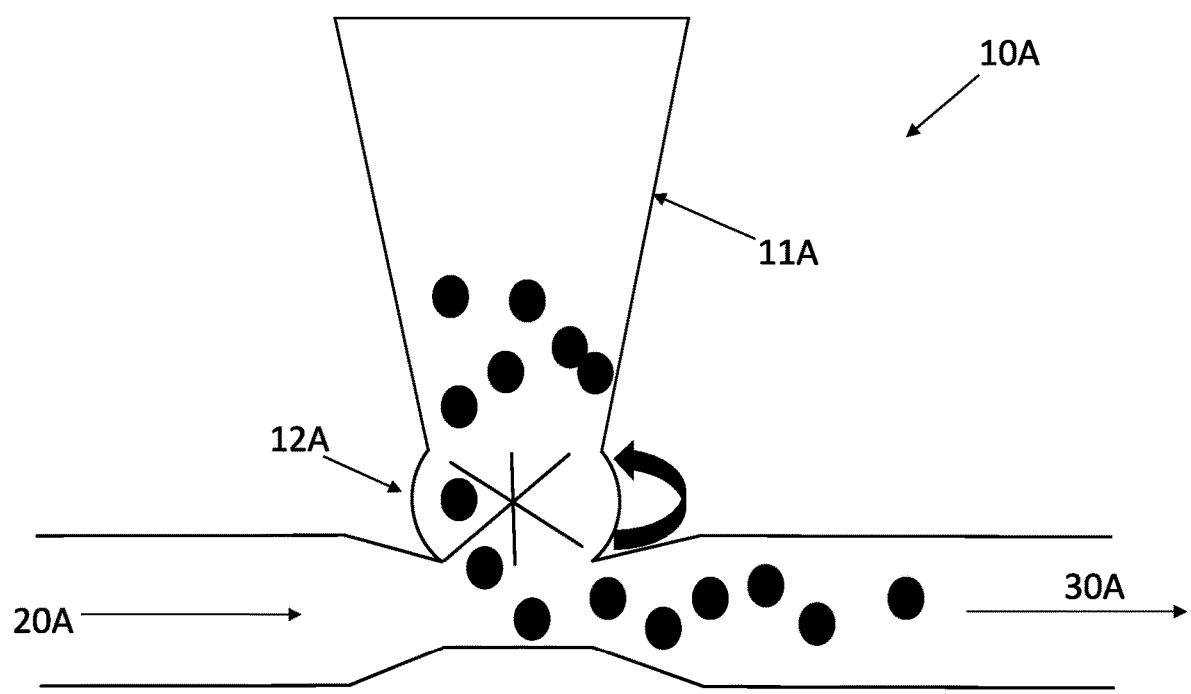
FIG. 3 is a schematic view illustrating a vessel according to an embodiment of the present disclosure.

It is to be understood that the configuration of the vessels 10A, 10B is not intended to be limited in any way. In an illustrative example as shown in FIG. 3, the vessel 10A (and/or the vessel 10B) may be a pneumatic powder feeder, such as a venturi feeder that includes a hopper 11A for receiving the nanotubes 11A (and/or a hopper 11B for receiving the electrode active material 11B) therein. The vessel 10A (and/or the vessel 10B) may also include a rotary valve 12A (and/or 12B) that feeds the nanotubes 12A (and/or the electrode active material 12B) into contact with the carrier gas 20A that is introduced to the vessel 10A (and/or the carrier gas 20B that is introduced into the vessel 10B) to form the aerosolized stream 30A (and/or 30B).

As shown in FIG. 4, the nanotubes may be provided in an aerosolized stream 30A directly from the vessel 10A that is configured as a nanotube synthesis reactor, in parallel with an aerosolized stream 30B of the electrode active material from the source 106. Accordingly, the aerosolized stream 30A may be a product stream exiting the nanotube synthesis reactor. For example, a carbon source or carbon precursor 130 may be introduced to the vessel 10A in the presence of one or more carrier gases 20A to form carbon nanotubes. The aerosolized stream 30A of carbon nanotubes exits the reactor outlet 175 and travels down a pipe or tube 412 to a hood 27 where the aerosolized carbon nanotubes are co-deposited with the aerosolized stream 30B of the electrode active materials as a self-standing layer 60 onto a porous flexible substrate 40. Although the pipes leading into the hood 27 are shown to bend at 90 degree angles '$\alpha$1, $\alpha$2' before reaching hood 27, other angles $\alpha$1, $\alpha$2 may be formed. In a non-limiting example, one or more of the angles $\alpha$1, $\alpha$2 may be a 180° angle that facilitates flow of the aerosolized streams 30A, 30B from the hood 27 to the porous substrate 40, e.g., as shown in FIG. 5. Although not shown, it is to be understood that more than one porous substrate 40 may be provided as described with respect to FIG. 2.

Carrier and fluidizing gases suitable for use with the present disclosure include, but are not limited to, argon, hydrogen, nitrogen, and combinations thereof. Carrier gases may be used at any suitable pressure and at any suitable flow rate to aerosolize the nanotubes and the electrode active materials and transport the aerosolized nanotubes and the aerosolized electrode active materials to the movable porous substrate at a sufficient velocity to form the self-standing electrode on the surface thereof. In some embodiments, the carrier gas may be argon, hydrogen, helium, or mixtures thereof. In some embodiments, the carrier gas may comprise argon at a flow rate of 850 standard cubic centimeters per minute (sccm) and hydrogen at a flow rate of 300 sccm.

The type of nanotubes used in the present disclosure are not limited. The nanotubes may be entirely carbon, or they made be substituted, that it is, have non-carbon lattice atoms. Carbon nanotubes may be externally derivatized to include one or more functional moieties at a side and/or an end location. In some aspects, carbon and inorganic nanotubes include additional components such as metals or metalloids, incorporated into the structure of the nanotube. In certain aspects, the additional components are a dopant, a surface coating, or are a combination thereof.

Nanotubes may be metallic, semimetallic, or semi-conducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "armchair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The nanotubes may range in length from about 50 nm to about 10 cm or greater.

The movable porous substrate may be rendered movable by any suitable means known to those of ordinary skill in the art. In some embodiments, the movable porous substrate may be a porous flexible substrate attached to a conveyor belt or a roll-to-roll system, such as roll-to-roll system 45 shown in FIGS. 4 and 5. The rate of motion of the movable porous substrate may be controllable, such as by a computer or manually by an operator. Control of the rate of motion may enable or facilitate control of the thickness of the composite obtained. Suitable porous flexible substrates, including but not limited to a filter or a frit, have pores appropriately sized so as to not permit passage of the composite. In some embodiments, the pores may be sized to permit passage of carrier gases and/or fluidizing gases.

In a non-limiting example, carbon nanotubes may be synthesized in a reactor or furnace from a carbon source or carbon precursor in the presence of a catalyst or catalyst precursor, at a temperature of about 1000 to about 1500° C., such as about 1300° C.

The present disclosure is not limited to the type or form of catalysts used for the production of carbon nanotubes. In various aspects, the catalyst particles are present as an aerosol. In some aspects, the catalyst materials are supplied as nanoparticles, including but not limited to colloidal metallic nanoparticles, comprising a transition metal, a lanthanide metal, or an actinide metal. For example, the catalyst may comprise a Group VI transition metal such as chromium (Cr), molybdenum (Mo), and tungsten (W), or a Group VIII transition metal such as iron (Fe), cobalt (Co), nickel (Ni), ruthenium (Ru), rhodium (Rh), palladium (Pd), osmium (Os), Iridium (Ir), and platinum (Pt). In some aspects, a combination of two or more metals are used, for example an iron, nickel, and cobalt mixture or more specifically a 50:50 mixture (by weight) of nickel and cobalt. The catalyst may comprise a pure metal, a metal oxide, a metal carbide, a nitrate salt of a metal, and/or other compounds containing one or more of the metals described herein. The catalyst may be added to the reactor at about 0.1 atom % to about 10 atom %, where atom % indicates the percentage of the number of catalyst atoms with respect to the total number of atoms in the reactor (catalyst and carbon precursor atoms).

Alternatively or in combination, a catalyst precursor may be introduced, wherein the catalyst precursor can be converted to an active catalyst under the reactor's conditions. The catalyst precursor may comprise one or more transition metal salts such as a transition metal nitrate, a transition metal acetate, a transition metal citrate, a transition metal chloride, a transition metal fluoride, a transition metal bromide, a transition metal iodide, or hydrates thereof. For example, the catalyst precursor may be a metallocene, a metal acetylacetonate, a metal phthalocyanine, a metal porphyrin, a metal salt, a metalorganic compound, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO3)3$, $Ni(NO3)2$ or $Co(NO3)2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

The catalyst particles may comprise a transition metal, such as a d-block transition metal, an f-block transition metal, or a combination thereof. For example, the catalyst particles may comprise a d-block transition metal such as an iron, nickel, cobalt, gold, silver, or a combination thereof. The catalyst particles may be supported on a catalyst support, wherein the catalyst support may be selected from alumina, silica, zirconia, magnesia, or zeolites. For example, the catalyst support may be a nanoporous magnesium oxide support. The catalyst support may be the same or different from the material selected for the matrix. In order to have catalyst particles on a catalyst support, the catalyst support material may be introduced into the catalyst material prior to adding the catalyst to the reactor. For example, a solution of the catalyst material, such as a molybdenum/cobalt mixture, may be combined with a solution of magnesium nitrate, heated together, and then cooled to produce a catalyst on a nanoporous MgO support. Alternately, a silica support may be impregnated with cobalt nitrate and ammonium heptamolybdate and dried for several hours to produce a cobalt/molybdenum catalyst on a porous silica support.

The present disclosure is not limited to the type of carbon precursors or carbon sources used to form carbon nanotubes such as one or more carbon-containing gases, one or more hydrocarbon solvents, and mixtures thereof. Examples of carbon precursors include, but are not limited to hydrocarbon gases, such as methane, acetylene, and ethylene; alcohols, such as ethanol and methanol; benzene; toluene; CO; and CO2. A fuel for carbon nanotube synthesis and growth comprises a mixture of one or more carbon precursors or carbon sources and one or more catalysts or catalyst precursors.

The fuel or precursor may be injected at a range of about 0.05 to about 1 ml/min, such as about 0.1 ml/min or about 0.3 ml/min, per injector. In some embodiments, more than one injector may be used, for example at large scale. The gas flow rate may be about 0.1 to about 5 L/min of hydrogen and/or about 0.2 to about 2 L/min helium or argon, such as about 5 L/min hydrogen, or about 0.3 L/min hydrogen and about 1 L/min argon. Without wishing to be bound to any particular theory, helium or argon may be included in the carrier gas to dilute the hydrogen concentration, for example to keep the hydrogen concentration below the explosive limit. Selection of a fuel injection rate and/or a gas flow rate may depend, for example, on the reactor volume, as will be apparent to those of ordinary skill in the art. In some embodiments, more than one reactor may be used in conjunction. In some embodiments, the reactor temperature profile consists of a starting low temperature, an increase to a peak or a maximum, and then a decrease, preferably to the starting low temperature. Without wishing to be bound by any particular theory, for a given reactor temperature profile, the injector position inside the reactor should be correlated with the precursor temperature so that the precursor evaporates from the point of injection, without droplet formation or decomposition, as can be determined by those of ordinary skill in the art, considering for example the boiling point and decomposition. In some embodiments, the injector tip may be inserted into the reactor, for example, by about 8 inches. The injection temperature, at the tip of the injector, may depend on the reactor or furnace temperature and upon the depth of insertion of the injector into the reactor or furnace. In some embodiments, the injection temperature at the tip of the injector is about 750° C. In some embodiments, the injector tip is inserted about 8 inches inside the reactor. The carbon nanotube reactor may be run for any suitable length of time to obtain the product composition and thickness desired, as can be determined by those of ordinary skill in the art, for example as long as there are starting materials.

Figure 6:
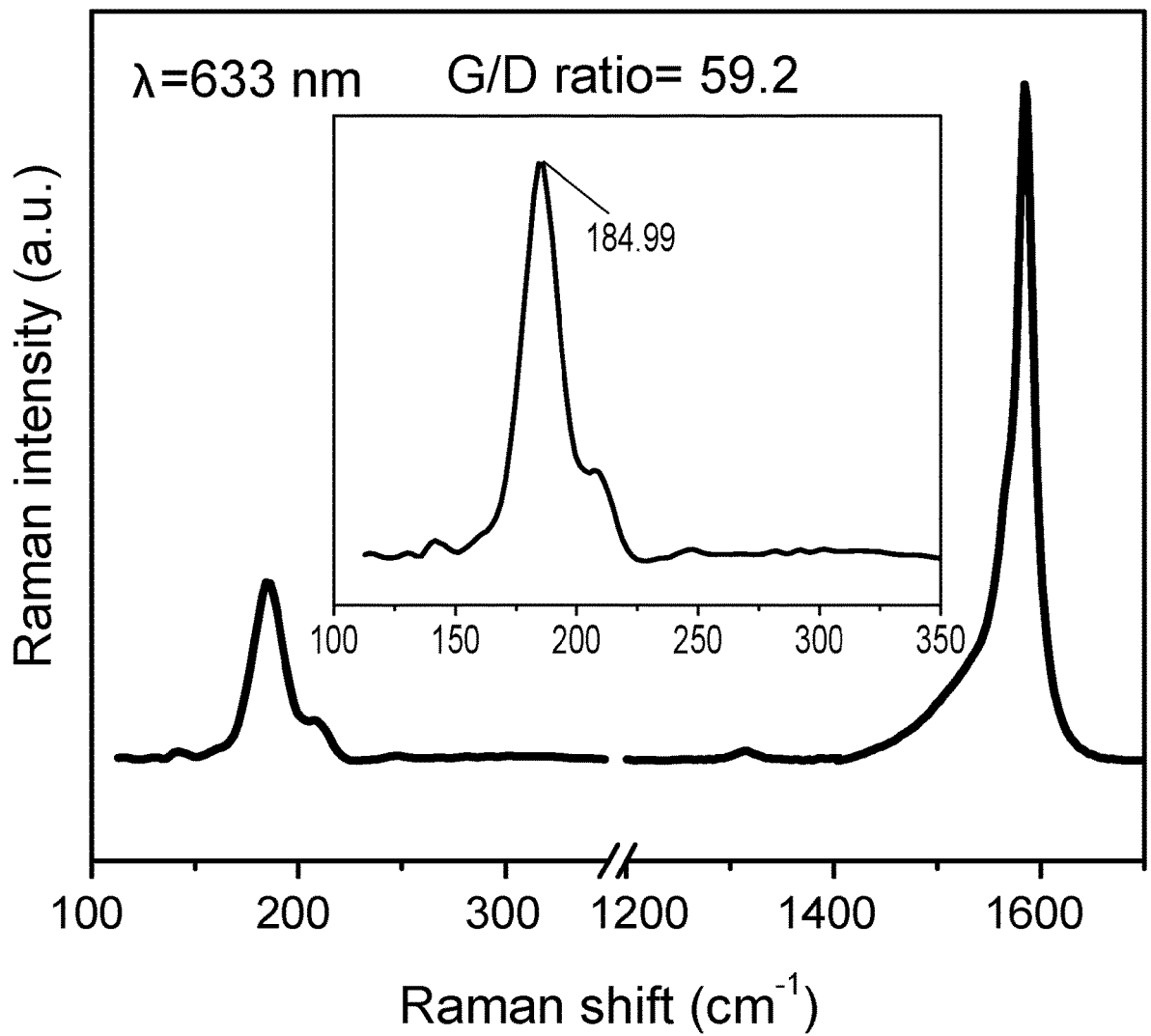
FIG. 6 shows Raman characterization ($\lambda=633$ nm) of carbon nanotubes synthesized according to an embodiment of the present disclosure.
Figure 7:
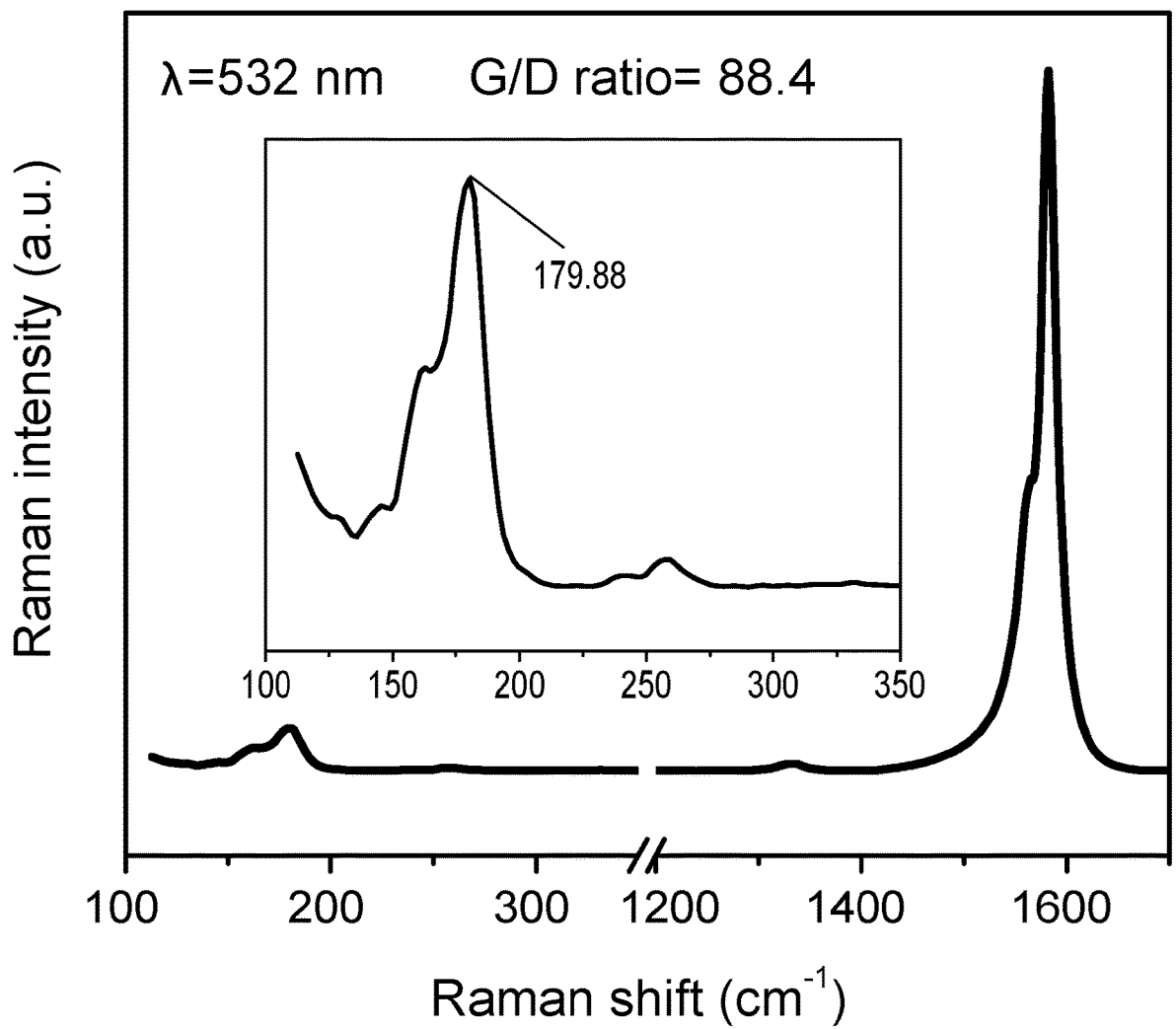
FIG. 7 shows Raman characterization ($\lambda=532$ nm) of carbon nanotubes synthesized according to an embodiment of the present disclosure.
Figure 8:
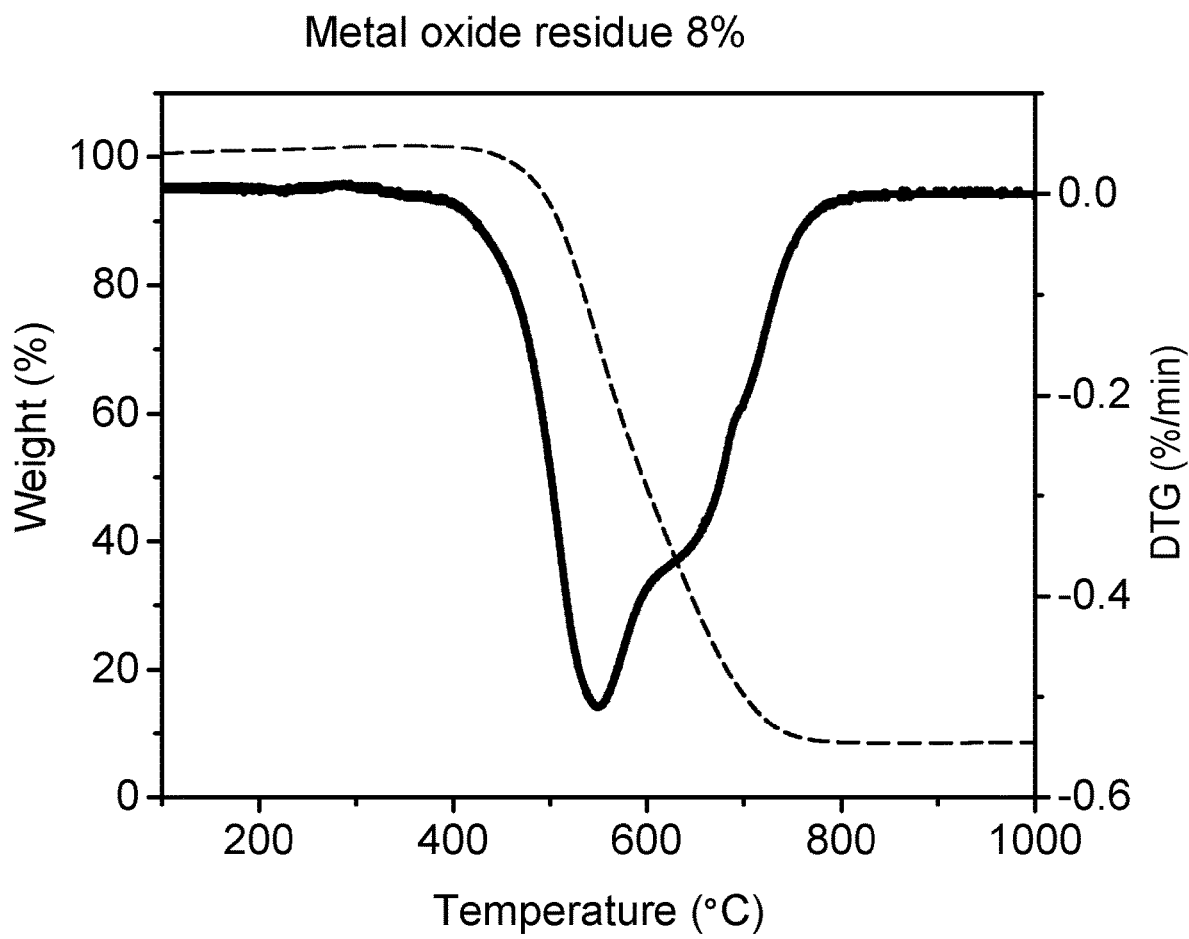
FIG. 8 shows derivative thermogravimetric analysis (DTG) of carbon nanotubes synthesized according to an embodiment of the present disclosure.

Carbon nanotubes synthesized according to the present disclosure may be characterized using any suitable means known in the art, including but not limited to derivative thermogravimetric analysis (DTG) and Raman spectroscopy, such as for calculation of the G/D ratio, as is disclosed in U.S. Patent Application Publication No. 2009/0274609, which is incorporated herein by reference in its entirety. The Raman spectra of SWNTs has three major peaks, which are the G-band at about 1590 $cm^{-1}$, D-band at about 1350 $cm^{-1}$, and the Radial breathing mode (RBM) at about 100-300 $cm^{-1}$. RBM frequency is proportional to an inverse of the diameter of SWNTs and can thus be used to calculate the diameter of the SWNT. Normally, a red shift in RBM peak corresponds to an increase in the mean diameter of SWNTs. The tangential mode G-band related to the Raman-allowed phonon mode E2g can be a superposition of two peaks. The double peak at about 1593 and 1568 $cm^{-1}$ has been assigned to semiconductor SWNTs, while the broad Breit-Wigner-Fano line at about 1550 $cm^{-1}$ has been assigned to metallic SWNTs. Thus, G-band offers a method for distinguishing between metallic and semiconducting SWNTs. The D-band structure is related to disordered carbon, the presence of amorphous carbon, and other defects due to the $sp^2$-carbon network. The ratio of the G-band to D-band in the Raman spectra (IG:ID or G/D ratio) of SWNTs can be used as an index to determine the purity and quality of the SWNTs produced. Preferably, IG:ID is about 1 to about 500, preferably about 5 to about 400, more preferably greater than about 7. Representative, non-limiting examples of Raman characterization of carbon nanotubes synthesized according to the present disclosure are shown in FIGS. 6 and 7. A representative, non-limiting example of DTG of carbon nanotubes synthesized according to the present disclosure is shown in FIG. 8.

As used herein, "co-depositing" of two or more substances refers to the simultaneous deposition of two or more substances, which were not previously in contact with one another. Co-depositing may be carried out by any suitable means known to those in the art, including but not limited to chemical vapor deposition. Co-depositing may be carried out in a fume hood or with other suitable apparatus, as will be known to those of ordinary skill in the art. In some embodiments, the carbon nanotubes and the electrode active material do not contact each other until they are co-deposited onto the substrate.

Collecting the mixture of single-walled carbon nanotubes and aerosolized electrode active material powder on a surface and removing the carrier gas may be carried out by any suitable means. The collecting surface of the porous substrate 40, 41 may be a porous surface, including but not limited to a filter or a frit, where the pores are appropriately sized to retain the mixture of carbon nanotubes and the electrode active material thereon to form the self-standing electrode while permitting passage of the carrier and fluidizing gases. The carrier and fluidizing gases may be removed after passing through the surface and by way of an outlet. In some embodiments, removal of the carrier gas may be facilitated by a vacuum source. With respect to filters, the filters may be in the form of a sheet and may comprise a variety of different materials including woven and nonwoven fabrics. Illustrative filter materials include, but are not limited to, cotton, polyolefins, nylons, acrylics, polyesters, fiberglass, and polytetrafluoroethylene (PTFE). To the extent the porous substrate is sensitive to high temperatures, one or more of the streams 30A and 30B may be precooled with dilution gases comprising a lower temperature and/or by directing one or more of the streams 30A and 30B through a heat exchanger prior to contacting the movable porous substrate.

As used herein, "fluidizing" refers to the conversion of a granular material from a static-like solid state to a dynamic fluid-like state, characterized by a tendency to flow. Fluidization may be achieved by passing a fluid, such as a liquid or a gas, up through the granular material, as will be known to those of ordinary skill in the art. In some embodiments, fluidizing the electrode active material comprises aerosolizing the electrode active material.

In some embodiments, the aerosolizing of the electrode active material comprises distributing an aerosolizing gas through a first porous frit and a bed of an electrode active material, in an aerosolizing chamber, to produce the aerosolized electrode active material powder. The aerosolizing chamber may be constructed with an appropriately sized porous material such that gas can pass through to enable aerosolization but that does not permit the active material to fall through the pores. The aerosolizing chamber is not limited to any particular configuration. Suitable aerosolizing gases include, but are not limited to, argon, helium, or nitrogen. In some embodiments, the aerosolizing gas may be the same as the carrier gas.

In some embodiments, the method further comprises synthesizing the single-walled carbon nanotubes in a carbon nanotube synthesis reactor. The reactor may comprise a catalyst or catalyst precursor, a carbon source, one or more gas inlets, one or more outlets, and a carbon nanotube growth zone. The one or more gas inlets may be configured to let in one or more carrier gases.

In some embodiments, the carbon nanotube synthesis reactor may include a quartz tube of 25 mm OD×22 mm ID×760 mm length and may be operated at atmospheric pressure. Alternatively, the carbon nanotube synthesis reactor may be designed as described in U.S. patent application Ser. No. 15/452,509, filed Mar. 7, 2017, and Ser. No. 15/452,500, filed Mar. 7, 2017, both of which are incorporated herein by reference. The carbon nanotube synthesis reactor may be arranged at a variety of angles with respect to the other equipment.

In some embodiments, the electrode active material is selected from graphite, hard carbon, lithium metal oxides, lithium iron phosphate, and metal oxides. In some embodiments, the electrode active material for the anode may be graphite or hard carbon. In some embodiments, the electrode active material for the cathode may be lithium metal oxide or lithium iron phosphate.

Alternatively, the electrode active material may be selected from electrode active materials described in U.S. patent application Ser. No. 15/452,509, filed Mar. 7, 2017, and Ser. No. 15/452,500, filed Mar. 7, 2017, both of which are incorporated herein by reference.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide ($LiNiMnCoO_2$). The metal oxide powders can have a particle size defined within a range between about 1 nanometer and about 100 microns. In a non-limiting example, the metal oxide particles have an average particle size of about 1 nanometer to about 10 nanometers.

Metals in lithium metal oxides according to the present disclosure may include but are not limited to one or more alkali metals, alkaline earth metals, transition metals, aluminum, and post-transition metals, and hydrates thereof. In some embodiments, the electrode active material is lithium nickel manganese cobalt oxide ($LiNiMnCoO_2$).

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, aluminum, gallium, indium, tin, thallium, lead, bismuth, or polonium.

In some embodiments, the method further comprises allowing the mixture of single-walled carbon nanotubes and electrode active material in the carrier gas to flow through one or more tubes connecting the aerosolizing reactor, the carbon nanotube synthesis reactor, and the collection chamber. In some embodiments, the one or more tubes are at least about 0.5" O.D. stainless tubing.

The loading or weight % of carbon nanotubes in the composite self-standing electrode product is based on the relative amounts of the nanotubes (or carbon source used to form the nanotubes) and the electrode active material. It is within the level of ordinary skill in the art to determine the relative starting amounts of carbon source, catalyst/catalyst precursor, and electrode active material that will afford a given loading or weight % of carbon nanotubes in the composite self-standing electrode product. In a non-limiting example, the self-standing electrode may comprise from 0.1% to 4% by weight carbon nanotubes, and the balance the electrode active material and optionally one or more additives. Optionally, the self-standing electrode may comprise from 0.2% to 3% by weight carbon nanotubes, and the balance the electrode active material and optionally one or more additives. Optionally, the self-standing electrode may comprise from 0.75% to 2% by weight carbon nanotubes, and the balance the electrode active material and optionally one or more additives. Additives and/or dopants may be present for each range in an amount of 0 to 5% by weight. In a non-limiting example, the self-standing electrode consists essentially of the carbon nanotubes and the electrode active material powder. In a non-limiting example, the self-standing electrode consists of the carbon nanotubes and the electrode active material powder. For each of the ranges, the self-standing electrode may be free of any binders. The lack of a binder results in a self-standing electrode with improved flexibility. Further, it has been discovered that a higher carbon nanotube content increases the flexibility of the self-standing electrode. Without being bound to any particular theory, this is likely due to the webbed morphology of the self-standing electrode in which there is a webbed arrangement of carbon nanotubes with the electrode active material contained or embedded within the web.

In a non-limiting example, the self-standing electrode may comprise a density of 0.9 to 1.75 g/cc. Optionally, the self-standing electrode may comprise a density of 0.95 to 1.25 g/cc. Optionally, the self-standing electrode may comprise a density of 0.75 to 2.0 g/cc. Optionally, the self-standing electrode may comprise a density of 0.95 to 1.60 g/cc.

In a non-limiting example, the self-standing electrode may comprise a thickness of up to 750 μm following collection on the porous substrate. Optionally, the self-standing electrode may comprise a thickness of 50 μm to 500 μm following collection on the porous substrate. Optionally, the self-standing electrode may comprise a thickness of from 100 μm to 450 μm following collection on the porous substrate. Optionally, the self-standing electrode may comprise a thickness of from 175 μm to 250 μm following collection on the porous substrate.

In some embodiments, the method of the present disclosure may further comprise treating the composite or self-standing electrode, including but not limited to pressing the composite or self-standing electrode. Without wishing to be bound to any particular theory, pressing may increase the density and/or lower the thickness of the self-standing electrode, which may improve such properties as rate performance, energy density, and battery life. Pressing of the self-standing electrodes may be carried out by applying a force to achieve a desired thickness and/or density, such as by using a rolling press or calendaring machine, platen press, or other suitable means, as will be known to those of ordinary skill in the art. Any suitable force may be applied, to achieve a desired thickness, and/or density, and/or impedance, such as but not limited to a force of about 1 ton, about 2 tons, about 3 tons, about 4 tons, about 5 tons, about 6 tons, about 7 tons, about 8 tons, about 9 tons, about 10 tons, about 15 tons, or any integer or range in between, such as between about 7 tons and about 10 tons. In some embodiments, pressing may be limited to pressing to a thickness of about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, or any integer or range in between. Without wishing to be bound by any particular theory, too thick of an electrode may be slow to produce energy or may not be suitably flexible. In some embodiments, it may be desirable to obtain an electrode foil that is flexible without formation of oxide or cracks. If the electrode is too thin, energy production may be rapid but it may be the case that not enough energy is produced. In addition, it may be desirable to regulate the distance between the rolls or rollers in a rolling press or calendaring machine, or between the plates of a platen press, by any suitable means known to those of ordinary skill in the art.

Determination of a suitable amount of pressing is within the level of ordinary skill in the art. As will be known to those of ordinary skill in the art, excessive pressing may cause the electrolyte to penetrate the electrode too much, as determined by measuring impedance and/or resistance to diffusion. As will be evident to those of ordinary skill in the art, it may be of interest to minimize the electrolyte diffusion resistance or coefficient for a given electrolyte, as measured by impedance. In a non-limiting example, the thickness of the self-standing electrode following pressing may be from 40% to 75% of the thickness of the untreated self-standing electrode, or the self-standing electrode following collection on the porous substrate. Optionally, the thickness of the self-standing electrode following pressing may be from 45% to 60% of the thickness of the untreated self-standing electrode, or the self-standing electrode following collection on the porous substrate.

In a non-limiting example, the density of the self-standing electrode following pressing is increased by 40% to 125% of the density of the untreated self-standing electrode, or the self-standing electrode following collection on the porous substrate. Optionally, the density of the self-standing electrode following pressing is increased by 45% to 90% of the density of the untreated self-standing electrode, or the self-standing electrode following collection on the porous substrate.

Electrodes pressed to thinner thicknesses may be unsuitably brittle. Non-limiting examples of electrode thickness and density, with and without pressing, are shown in the table below:

| Sample No. | Weight (mg) | Single-walled nanotube loading (weight %) | Original thickness (μm) | Original density (g/cc) | Thickness after pressing (mm) | Pressed density (g/cc) |
| --- | --- | --- | --- | --- | --- | --- |
| 1 | 417 | 1.2 | 125 | 1.20 | unknown | unknown |
| 2 | 612 | 1.1 | 200 | 1.11 | unknown | unknown |
| 3 | 572 | 1.1 | 200 | 1.03 | unknown | unknown |
| 4 | 318 | 1.9 | unknown | unknown | unknown | unknown |
| 5 | 138 | 1.5 | unknown | unknown | unknown | unknown |
| 6 | 151 | 1.6 | unknown | unknown | unknown | unknown |
| 7 | 293 | 0.46 | 196 | 1.25 | 112 | 2.14 |
| 8 | 265 | 0.73 | 211 | 1.05 | 148 | 1.49 |
| 9 | 339 | 0.41 | 244 | 1.16 | 128 | 2.20 |
| 10 | 811 | 0.21 | 434 | 1.56 | 220 | 2.28 |
| 11 | 266 | 0.63 | 231 | 0.96 | 109 | 2.03 |

In some embodiments, the fluidizing of the electrode active material comprises distributing an aerosolizing gas through, sequentially, a porous frit and a bed of the electrode active material, in an active material container, to form an aerosolized electrode active material. The pores of the porous frit may be sized to permit passage of the aerosolizing gas through to enable aerosolization but not permit the active material to fall through the pores. The active material container may be any container capable of fluidizing, such as aerosolizing, the electrode active material, including but not limited to a modified gas washing bottle. Aerosolizing gases suitable for use with the present disclosure include but are not limited to an inert gas, such as argon gas or helium gas; hydrogen gas; nitrogen gas; or a combination thereof. In some embodiments, the aerosolizing gas is the same as the carrier gas.

In some embodiments, the present disclosure is directed to an apparatus for producing a self-standing electrode, the apparatus comprising a carbon nanotube synthesis reactor configured to synthesize carbon nanotubes; an active material container configured to fluidize an electrode active material; a movable porous flexible substrate configured to collect the carbon nanotubes and the fluidized electrode active material to form the self-standing electrode comprising a composite of the carbon nanotubes and the electrode active material. All embodiments described for the method apply to the apparatus with equal force, and vice versa.

In some embodiments, the carbon nanotube synthesis reactor comprises one or more gas inlets, one or more gas outlets, and a carbon nanotube growth zone where a catalyst or catalyst precursor and a carbon source are used to grow the carbon nanotubes.

In some embodiments, the active material container comprises a porous frit; and a vertical shaker. The active material container may further contain one or more gas inlets and one or more gas outlets, and the one or more gas inlets may be configured to take in one or more fluidizing gases, such as one or more aerosolizing gases.

In some embodiments, the movable porous flexible substrate is connected to a roll-to-roll system.

In some embodiments, the present disclosure is directed to a self-standing electrode, comprising a composite of an electrode active material and single-walled carbon nanotubes; wherein the self-standing electrode does not contain binder material or a metal-based current collector material.

In some embodiments, the electrode is characterized by a webbed morphology or a net. In some embodiments, a webbed morphology or a net is a webbed arrangement of carbon nanotubes with the electrode active material contained or embedded within the carbon nanotube web or net.

Composites or self-standing electrodes prepared according to the present disclosure may be of any desired thickness and may be cut according to requirements. Thickness may be controlled by factors including, but not limited to, the rate of motion of the movable substrate, the rate of deposition of the carbon nanotubes and/or the electrode active material, and the carbon nanotube loading (weight %).

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A method of making a self-standing electrode, the method comprising:
   fluidizing an electrode active material; and
   co-depositing the fluidized electrode active material and single-walled carbon nanotubes onto a movable porous flexible substrate to form a self-standing electrode that is a composite of the electrode active material and the single-walled carbon nanotubes; and
   removing the self-standing electrode from the porous flexible substrate,
   wherein the self-standing electrode has a density of 0.75 g/cc to 2.28 g/cc, and
   wherein the self-standing electrode comprises 0.1% to 4% by weight carbon nanotubes.

2. The method of claim 1, further comprising synthesizing the single-walled carbon nanotubes in a carbon nanotube synthesis reactor.

3. The method of claim 1, wherein the electrode active material is selected from graphite, hard carbon, lithium metal oxides, lithium iron phosphate, and metal oxides.

4. The method of claim 1, wherein the fluidizing of the electrode active material comprises distributing a carrier gas through, sequentially, a porous frit and a bed of the electrode active material.

5. The method of claim 1, wherein the density of the self-standing electrode is provided by pressing the self-standing electrode to a selected thickness.

6. The method of claim 5, wherein the selected thickness is between about 100 microns and 250 microns.

7. The method of claim 6, wherein the selected thickness is between about 100 microns and 200 microns.

8. The method of claim 5, wherein the self-standing electrode has an initial thickness prior to pressing, and wherein the selected thickness is from about 40% to 75% of the initial thickness.

9. The method of claim 8, wherein the selected thickness is from about 45% to 60% of the initial thickness.

10. The method of claim 5, wherein the self-standing electrode has an initial density prior to pressing, and wherein the density is about 40% to 125% greater than the initial density.

11. The method of claim 10, wherein the density is about 45% to 90% greater than the initial density.

12. The method of claim 5, wherein pressing comprises applying between about 7 tons and 10 tons of force to the self-standing electrode.

13. The method of claim 5, wherein pressing is performed by a rolling press, a calendaring machine, a platen press, or a combination thereof.

14. The method of claim 1, further comprising cutting the self-standing electrode.

15. The method of claim 1, wherein fluidizing the electrode active material comprises distributing a carrier gas through a bed of the electrode active material, and wherein the porous flexible substrate comprises a plurality of pores sized to allow passage of the carrier gas therethrough.

16. The method of claim 15, wherein the plurality of pores are sized to prevent passage of the composite therethrough.

17. The method of claim 15, wherein the porous flexible substrate comprises a filter or a frit.

18. The method of claim 17, wherein the filter comprises a material selected from the group consisting of cotton, polyolefins, nylons, acrylics, polyesters, fiberglass, polytetrafluoroethylene, and combinations thereof.

19. The method of claim 15, wherein the carrier gas comprises argon gas, helium gas, hydrogen gas, nitrogen gas, or a combination thereof.

20. The method of claim 4, wherein co-depositing the fluidized electrode active material and single-walled carbon nanotubes onto the movable porous flexible substrate comprises passing the carrier gas through the movable porous flexible substrate and removing the carrier gas via an outlet, wherein removing the carrier gas is facilitated by a vacuum source.

* * * * *